July 21, 1970 KATSUYUKI IWAI ET AL 3,520,992

LEVEL INDICATOR SYSTEM FOR COMPOSITE VIDEO SIGNALS

Filed April 19, 1967

United States Patent Office 3,520,992
Patented July 21, 1970

3,520,992
LEVEL INDICATOR SYSTEM FOR COMPOSITE VIDEO SIGNALS

Katsuyuki Iwai, Fujio Sato, and Motonori Fukatsu, Tokyo, Japan, assignors to Akai Electric Company Limited, Tokyo, Japan, a Japanese corporation
Filed Apr. 19, 1967, Ser. No. 631,924
Claims priority, application Japan, Apr. 21, 1966, 41/25,451
Int. Cl. H04n 5/76, 7/02
U.S. Cl. 178—6 4 Claims

ABSTRACT OF THE DISCLOSURE

A level indicator fitted in a video tape recorder for the visual indication of composite video signal fed to said recorder, said indicator being provided with a separator for the contained sync signal, a differentiating circuit for processing the thus separated sync pulse series, a shaper for obtaining a control signal pulse series from said differentiated pulse series, a phase inverter adapted for processing said control signal pulse series, clamping means for clamping said composite signal with its black level to zero potential by means of the inverted control pulse series, a detector for detecting the amplitude of the contained sync pulse series in the composite signal, and a visual indicator for the display of the thus detected amplitude.

This invention relates to improvements in and relating to a level indicator system for composite video signals, especially adapted for smaller size video tape recording and reproducing machines, hereinafter briefly referred to as "video tape recorders," mainly for domestic use.

It is of importance in the course of magnetic recording of the composite video signal to indicate the signal level, because for optimumly performing the desired recording various factors such as magnetic saturation of the recording medium, gain of the reproducing amplifier employed, *S/N* ratio and the like must be controlled.

An example of the apparatus for providing the occasional and fluctuating level of the composite television signal is the wave form supervising apparatus fitted with a Brown tube. This kind of apparatus is of highly complicated design with tremendous dimensional demands and therefore adapted for use in large firms, such as television broadcasting stations.

This type of machine is of stationary design and very high in its costs and therefore substantially difficult to equip to smaller size, domestic video tape recorders.

Another type of the signal level indicator, especially adapted for use with domestic video tape recorders is such an apparatus wherein the composite video signal per se is fed to a rectifier circuit and the rectified current is conveyed to an indicator means for display of the fed current as a generalized and rough indicia of the true signal level. This kind of indication is, however, only a mean value which may considerably differ say, 5 dbs., between the two extreme picture conditions, or more specifically, the black and the white level of the video signal. This operating characteristic is therefore far from the ideal to be desired.

The main object of the present invention is to provide a level indicator system for a composite television signal, adapted for use, especially with domestic video tape recorders and embodying a highly simplified design, yet highly reliable in its working performance.

Another object of the invention is to provide a level indicator system of the above kind, capable of accurately indicating the desired values of the composite television signal, irrespective of its occasional and fluctuating picture contents.

These and further objects, features and advantages of the present invention will become clearer from the following description and with reference to the accompanying drawing which illustrates a preferred embodiment of the invention shown for the purpose of illustration only.

Figures 1, 2, 3:
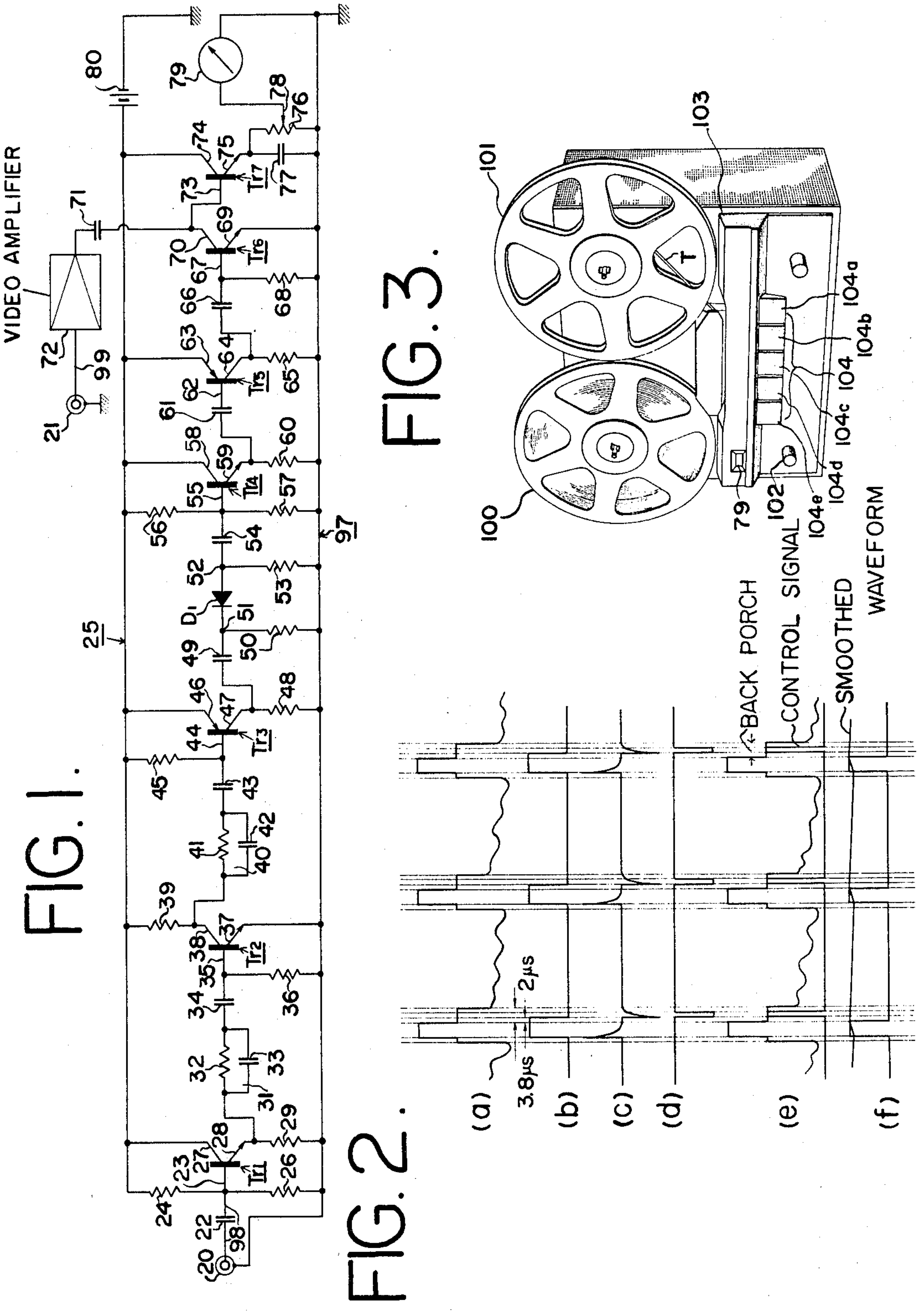
FIG. 1 is a wiring diagram illustrative of an electronic circuit embodying the novel indicator system.
FIG. 2 is a chart showing several wave forms as appearing at several places of said electronic circuit.
FIG. 3 is an outline perspective view of a video tape recorder embodying the novel principles of the invention.

Generally speaking, the television signal is defined, by the rules controlling the broadcasting service, to have a predetermined ratio of video signal to synchronizing signal comprising in combination the television signal. As a standard example, the video signal has the range of 1 volt between its white- and black-levels, while the synchronizing signal is defined by a 0.4 volt range.

The basic idea embodied in the novel level indicator system according to this invention resides in such the fact that the synchronizing signal is "clamped" for detecting the practical amplitudes thereof and the thus detected amplitudes are subjected to a smoothing step in a smoothing circuit, so as to indicate the level of the composite television signal concerned.

The level of the television signal is subjected to modification depending upon the selected television channel, while the peak-to-peak value of the signal varies naturally, depending upon the occasional picture contents of the video signal contained, as was already referred to hereinbefore.

According to the proposed technique according to the novel teaching, the level of composite video signal is indicated by the amplitude of synchronizing signal contained therein. As an example, television channel 1 is assumed to have a composite video signal having a 0.5 volt of peak-to-peak value and comprising a 0.4 volt range of synchronizing signal components and a 0.1 volt range of video signal components. On the other hand, channel 2 is assumed to have a composite video signal having a 0.7 volt of peak-to-peak value and comprising a 0.2 volt range of synchronizing signal components and a 0.5 volt range of video signal components. In these cases, the ranges of the video signal components will amount to 2:1 which means that there is a considerable difference in the range under consideration, which will cause a substantial error in the desired level of indication, when it is measured by means of a conventional indicator of simpler design and commonly available among domestic or non-professional users.

Now referring to the accompanying drawing, especially FIG. 1 thereof, numerals 20 and 21 represent separate input terminals adapted respectively for the reception of same composite television signal, for instance, fed from a domestic television receiving set. Numerals 98 and 99 denote respective cable conductors, each having an outer conductive sheath and an inner elongate conductor, although not specifically shown, said sheath being grounded to the chassis, as in the case of the conventional technique.

The inner conductor of cable 98 is connected through a coupling capacitor 22 to the base electrode at 23 of a n-p-n junction transistor *Tr*1 of grounded collector configuration. The base electrode 23 is connected through resistor 24 to a positive line 25 which terminates to the positive side of a D.C. voltage source 80; and through resistor 26 and conductor 97 to ground. The negative side of the source 80 is grounded, as shown.

The collector electrode at 27 is connected directly to positive line 25, while the emitter electrode at 28 is connected through resistor 29 to the grounding conductor 97.

Positive line 25 is connected with the positive side of battery 80 or any suitable D.C. source, the negative side of which is grounded.

Transistor T*r*1 is an emitter follower, serving as an impedance converter having a high input impedance and a low output impedance.

Emitter electrode 28 of transistor T*r*1 is connected through a time constant circuit 31 comprising a parallel combination of resistor 32 and capacitor 33, and a further capacitor 34 to the base electrode at 35 of n-p-n transistor T*r*2 of grounded emitter configuration. The base electrode is connected through resistor 36 to grounding conductor 97. Emitter 37 of transistor 37 is connected directly with grounding conductor 97, while collector electrode 38 of the transistor is connected through load resistor 39 to positive conductor 25. Transistor T*r*2 serves as amplitude selector for synchronizing signal, and time constant circuit 31 acts as noise control circuit.

Collector electrode 38 of transistor T*r*2 is connected through a time constant circuit 40 comprising a parallel combination of resistor 41 and capacitor 43, and a further speed up capacitor 42 to the base electrode at 44 of p-n-p transistor T*r*3 of grounded emitter configuration.

The base electrode 44 is connected through a resistor 45 to positive conductor 25, while emitter electrode 46 is connected directly to the conductor 25 and collector electrode 47 is connected through load resistor 48 to grounding conductor 97.

Transistor T*r*3 and time constant circuit 40 constitute in combination a pulse amplifier, while capacitor serves for speed-up service.

A differentiating circuit comprising capacitor 49 and resistor 50 is inserted between the collector at 47 if transistor T*r*3 and the grounding conductor 97. Diode D1 is inserted between junction points 51 and 52, said diode having a negative polarity for positive-going signals.

Junction point 52 is connected respectively through resistor 53 to grounding conductor 97 and through coupling capacitor 54 to the base electrode at 55 of n-p-n transistor T*r*4 of grounded collector configuration. The base electrode 55 is connected respectively through resistor 56 to positive conductor 25, and through resistor 57 to the grounding conductor 97.

Collector electrode 58 of tranistor T*r*4 is connected directly with positive conductor 25, and emitter electrode 59 of the transistor is connected through load resistor 60 to the grounding conductor 97.

Transistor T*r*4 acts as a shaper to form a square wave at the arrival of each of the trailing edges of negative peaks of a differentiated signal fed from said differentiating circuit, as will be more fully described hereinafter.

Emitter electrode 60 of transistor T*r*4 is connected through coupling capacitor 61 to the base electrode at 62 of p-n-p transistor T*r*5 of grounded emitter configuration. Emitter electrode 62 of transistor T*r*5 is connected directly with positive conductor 25, while collector electrode 64 is connected through load resistor 65 to the grounding conductor 97.

Transistor T*r*5 acts as a phase inverter for converting the negative-going pulse signal from transistor T*r*4 into a positive-going pulse signal, as will be more fully described hereinafter.

Collector electrode 64 of transistor T*r*5 is connected through coupling capacitor 66 to the base electrode at 67 of n-p-n transistor T*r*6 which is designed and arranged to act as a synchronizing clamper.

Base electrode 67 of transistor T*r*6 is connected through resistor 68 to the grounding conductor 97, and emitter electrode 69 is connected directly to the same grounding conductor. Collector electrode 70 of the same transistor is connected through capacitor 71 with the output side of video amplifier 72.

The synchronizing clamper acts, as will be more fully described hereinafter, to clamp the output signal in the form of amplified composition video signal, from the amplifier 72, at its black level to the ground potential.

Collector electrode 70 of transistor T*r*6 is connected to the base electrode at 73 of n-p-n transistor T*r*7 of grounded collector configuration. Collector 74 of the transistor T*r*6 is connected directly to positive conductor 25, and emitter 75 is connected through a smoother circuit comprising a parallel combination of potentiometer 76 and capacitor 77, to the grounding conductor 97. Slider 78 of potentiometer 76 is connected through level indicator 79 to the grounding conductor 97. Transistor T*r*7 acts as a slicer.

In FIG. 3, an outline perspective of the video tape recorder embodying the above-mentioned level indicator circuit is shown.

In this figure, numerals 100 and 101 denote a tape supply reel and a tape winding-up reel, the both being of conventional design and rotatably mounted as is conventional. Magnetic recordable and reproducible tape at T is threaded between the two reels. Level indicator 79 is seen as mounted on the panel at 103 of the tape recorder, which panel mounts said reels. Numeral 102 denotes a manual volume control knob which is physically connected in gang connection with the slider 78 of said potentiometer 76.

A group of manually operable operation control buttons, generally shown with 104, comprises as conventionally fast tape fed control 104*a*, play control 104*b*, stop control 104*c*, record control 104*d* and fast rewinding control 104*e*, are also provided on the panel 103.

The operation of the level indicator so far shown and described is as follows:

When the play control button 104*b* and record control button 104*d* are simultaneously depressed, the machine will start for the recording mode and both reels 100 and 101 are driven from a thus energized main drive motor not shown, and the various circuits so far described and contained within the machine are also energized.

Then, a composite video signal, as schematically illustrated at *a*, FIG. 2, is fed, upon subjected to a video detection television receiving set, not shown, to input terminal 20 and thence conveyed through coupling capacitor 22 to the base 23 of emitter follower T*r*1.

The fed signal is amplified at the emitter follower and appears at the emitter 28, thence conveyed through time constant circuit 31 and capacitor 34 to the base 35 of sync separator T*r*2. In this way, the thus separated sync signal appears at the collector 38 of the transistor T*r*2. The separated sync signal is then conveyed through time constant circuit 40 and capacitor 43 to the base 44 of pulse amplifier T*r*3 and the thus amplified signal appears at the collector 47.

Each pulse of the thus amplified signal has a longer duration period by 2 microseconds equal to the duration of the back porch (as an example: 3.8 microseconds) on account of the carrier storage effect provided by the transistor T*r*3 in the course of the amplification. See FIG 2 at *b*.

The amplified sync signal is then subjected to a differentiating step at the circuit provided for this purpose and comprising capacitor 49 and resistor 50. The thus resulted signal form is shown schematically and by way of example in FIG. 2 at *c*.

The negative peaks of the thus differentiated signal only is led to pass through the diode D1, thence conveyed through coupling capacitor 54 to the base 55 of transistor T*r*4 of the shaper circuit. The thus shaped signal is as shown schematically and by way of example in FIG. 2 at *d*, and each of the contained pulses have a duration period at least equal to (3.8–2 microseconds), appearing at the emitter electrode 59. This shaped pulse series is then led through coupling capacitor 61 to the base 62 of phase inverter T*r*5.

The phase-inverted pulse series, acting as a control signal, is conveyed through coupling capacitor 66 to the base 67 of clamping transistor *Tr*6.

On the other hand, the same composite video signal as in the case of terminal 20, is fed to the second input 21, which is also connected to a proper stage of the same television receiving set referred to hereinbefore, is subjected to an amplification step in the video amplifier 72, and then conveyed through capacitor 71 to the collector 70 of the clamping transistor *Tr*6.

This composite video signal thus amplified is clamped with its back porch level or black level to zero potential, by utilizing the aforementioned control signal.

The relative phase relation between the composite video signal led to the collector 70 of the clamping transistor *Tr*6, and the control signal as applied to the base 67 of the same transistor is shown schematically in FIG. 2 at *e*. It can be noted that when the control signal is applied to the base 67 of transistor *Tr*6, the latter becomes conductive and current will flow through capacitor 71 to collector 70 and emitter 69, the capacitor being therefore charged up and the potential at the collector 70 being dropped to zero.

When the control signal is absent at the base 67, D.C. potential at collector 70 is kept at zero under the influence of the charged potential in the capacitor, thus a synchronizing clamping being carried into effect.

The composite video signal clamped in the aforementioned way with its black level at zero potential is then conveyed to the base 73 of slicer transistor *Tr*7 and the clamped signal is sliced at the black level, thus the sync signal only appears at the emitter 75, thence being conveyed to the smoothening circuit comprising potentiometer 76 and capacitor 77, for being subjected to a smoothening effect thereby provided. The thus smoothed signal is shown in FIG. 2 at *f*.

The smoothed signal is then conveyed through the slider 78 of potentiometer 79 to the level indicator 79, preferably a voltmeter, where the desired level of the fed composite video signal is displayed in a visual form.

It will be clear from the foregoing that the composite video signal is displayed in its level always under such a constant condition wherein the video signal component is taken as the reference, or regardless of occasional picture contents of the video signal components. In addition, according to the invention, the composite video signal is clamped at its black level and a slicing operation is carried into effect at the black level so as to detect the amplitude of the sync signal components. The amplitude detection can be carried about by means of a simpler detector, yet in a highly reliable manner.

Therefore, according to the novel teaching, the desired level indication may be performed in a highly simplified and reliable manner, in comparison with the conventional comparative technique as employable among non-professional circles.

Therefore, the utilizer of the tape recorder fitted with the so far shown and described composite video signal level indicator can observe at the visual indicator 79 and adjust the volume control knob 102, so as to operate the machine at an optimum recording signal level.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A level indicator for a composite video signal including a video signal component and a synchronizing signal component, said indicator comprising:

(a) input means for reception of said composite signal, (b) signal processing means connected to said input means for clamping said composite video signal at its black level, (c) detector means responsive to the output of said signal processing means for detecting the amplitude of the synchronizing signal components, and (d) indicating means connecting to said detecting means for indicating the value of the detected synchronizing signal components.

2. A level indicator as recited in claim 1 wherein said signal processing means comprises:

(a) synchronizing signal separator means connected to said input means for generating a separated synchronizing pulse series, (b) a differentiating circuit for differentiating said separated synchronizing pulse series, and (c) synchronizing clamping means also connected to said input means and responsive to the differentiated separated synchronizing pulse series for clamping said composite video signal at its black level.

3. A level as recited in claim 2 wherein said detector means comprises a slicing circuit connected to receive the output of said synchronizing clamping means and slicing said clamped composite video signal at its black level.

4. A level indicator as recited in claim 3 wherein said indicating means comprises:

(a) a smoothing circuit connected to the output of said slicing circuit for smoothing the detected amplitude of the synchronizing signal components, and (b) an indicator connected to the output of said smoothing circuit to display average value of said detected synchronizing signal components.

References Cited

UNITED STATES PATENTS

| | | | |
|---|---|---|---|
| 2,293,528 | 8/1942 | Barco et al. | 178—7.3 |
| 3,369,082 | 2/1968 | Hibbard | 178—6.6 X |
| 3,435,252 | 3/1969 | Eubanks | 330—9 X |

ROBERT L. GRIFFIN, Primary Examiner

RICHARD K. ECKERT, Jr., Assistant Examiner

U.S. Cl. X.R.

178—6.6, 7.1, 7.3, 69.5